United States Patent
Latz et al.

(10) Patent No.: US 9,005,515 B2
(45) Date of Patent: Apr. 14, 2015

(54) HIGH IMPACT RESISTANT POLYOXYMETHYLENE FOR EXTRUSION BLOW MOLDING

(75) Inventors: Guido Latz, Hattersheim (DE); Ursula E. Ziegler, Mainz-Kostheim (DE); Lowell Larson, Independence, KY (US)

(73) Assignee: Ticona GmbH, Sulzbach (Taunus) (DE)

( * ) Notice: Subject to any disclaimer, the term of this patent is extended or adjusted under 35 U.S.C. 154(b) by 246 days.

(21) Appl. No.: 13/433,517

(22) Filed: Mar. 29, 2012

(65) Prior Publication Data

US 2012/0276314 A1    Nov. 1, 2012

Related U.S. Application Data

(60) Provisional application No. 61/470,742, filed on Apr. 1, 2011.

(30) Foreign Application Priority Data

Apr. 1, 2011    (EP) .................................. 11160800

(51) Int. Cl.
| | | |
|---|---|---|
| B29C 49/04 | (2006.01) |
| C08L 59/02 | (2006.01) |
| C08G 18/08 | (2006.01) |
| C08G 18/54 | (2006.01) |
| C08G 18/56 | (2006.01) |
| C08G 18/79 | (2006.01) |
| C08K 5/00 | (2006.01) |
| C08K 5/16 | (2006.01) |
| C08L 75/04 | (2006.01) |

(52) U.S. Cl.
CPC ............. *C08L 59/02* (2013.01); *C08G 18/0895* (2013.01); *C08G 18/54* (2013.01); *C08G 18/56* (2013.01); *C08G 18/79* (2013.01); *C08G 18/798* (2013.01); *C08K 5/00* (2013.01); *C08K 5/16* (2013.01); *C08L 75/04* (2013.01)

(58) Field of Classification Search
CPC .......................... B29C 47/0054; B29C 49/00
See application file for complete search history.

(56) References Cited

U.S. PATENT DOCUMENTS

| | | |
|---|---|---|
| 2,993,025 A | 7/1961 | Alsup et al. |
| 3,161,616 A | 12/1964 | Brown et al. |
| 3,161,617 A | 12/1964 | Kritzler et al. |
| 3,269,988 A | 8/1966 | Braude et al. |
| 3,340,234 A | 9/1967 | Brown et al. |
| 3,346,663 A | 10/1967 | Kern et al. |
| 3,380,966 A | 4/1968 | Fouts |
| 3,393,179 A | 7/1968 | Leverett et al. |
| 3,642,940 A | 2/1972 | Burg et al. |
| 3,865,284 A | 2/1975 | Kazama et al. |
| 3,998,791 A | 12/1976 | Radici et al. |
| 4,097,453 A | 6/1978 | Radici et al. |
| 4,111,912 A | 9/1978 | Sextro et al. |
| 4,169,867 A | 10/1979 | Burg et al. |
| 4,195,158 A | 3/1980 | Burg et al. |
| 4,431,794 A | 2/1984 | Sadlowski et al. |
| 4,493,751 A | 1/1985 | Cherdron et al. |
| 4,517,319 A | 5/1985 | Reske et al. |
| 4,640,949 A | 2/1987 | Wagman |
| 4,683,267 A | 7/1987 | Linder et al. |
| 4,689,373 A | 8/1987 | Auerbach et al. |
| 4,780,498 A | 10/1988 | Goerrissen et al. |
| 4,795,477 A | 1/1989 | Kusumgar et al. |
| 4,804,716 A | 2/1989 | Flexman, Jr. |
| 4,828,755 A | 5/1989 | Kusumgar et al. |
| 4,845,161 A | 7/1989 | Richardson |
| 4,929,712 A | 5/1990 | Sugiyama et al. |
| 4,950,773 A | 8/1990 | Monnier et al. |
| 4,968,756 A | 11/1990 | Silvis et al. |
| 4,975,518 A | 12/1990 | Broussard et al. |
| 4,975,519 A | 12/1990 | Yang et al. |
| 4,978,725 A | 12/1990 | Reske et al. |
| 4,996,253 A | 2/1991 | Mulholland |
| 5,004,784 A | 4/1991 | Huynh-Ba |
| 5,004,798 A | 4/1991 | Broussard et al. |
| 5,039,741 A | 8/1991 | Burg et al. |
| 5,043,398 A | 8/1991 | Auerbach et al. |
| 5,143,982 A | 9/1992 | Niino |
| 5,144,005 A | 9/1992 | Sextro et al. |
| 5,173,532 A | 12/1992 | Endo et al. |
| 5,183,860 A | 2/1993 | Kashihara |
| 5,206,308 A | 4/1993 | Auerbach et al. |
| 5,286,807 A | 2/1994 | Flexman, Jr. |
| 5,288,840 A | 2/1994 | Morishita et al. |
| 5,292,824 A | 3/1994 | Nagai et al. |
| 5,310,822 A | 5/1994 | Kielhorn-Bayer et al. |

(Continued)

FOREIGN PATENT DOCUMENTS

| | | |
|---|---|---|
| AU | 2148770 | 4/1972 |
| DE | 1158709 | 12/1963 |
| DE | 2 263 300 A1 | 7/1974 |
| DE | 4436107 A1 | 4/1996 |
| DE | 10003370 | 8/2001 |
| EP | 0108 324 A | 5/1984 |
| EP | 0137305 A2 | 4/1985 |
| EP | 0276080 A1 | 7/1988 |
| EP | 0511412 | 4/1991 |

(Continued)

OTHER PUBLICATIONS

Search Report and Written Opinion for Application No. PCT/EP2012/055700 dated Aug. 6, 2012.
Search Report and Written Opinion for EP Application No. 11160800.6-1214 dated Jun. 30, 2011.
Co-pending U.S. Appl. No. 13/879,360, Larson, et al., filed Apr. 12, 2013.
Co-pending U.S. Appl. No. 12/423,671, Klaus Kurz, et al., filed Apr. 14, 2009.
Co-pending U.S. Appl. No. 12/904,575, Larson, et al., filed Oct. 14, 2002.
Co-pending U.S. Appl. No. 13/631,072, Lowell Larson, filed Sep. 28, 2012.

(Continued)

*Primary Examiner* — Monica Huson

(74) *Attorney, Agent, or Firm* — Dority & Manning, P.A.

(57) ABSTRACT

The present invention relates to a method for the manufacturing of a container or parts of a container for fuel or compressed gases by extrusion blow molding and container or parts of container for fuel or compressed gases made thereof.

15 Claims, No Drawings

(56) References Cited

U.S. PATENT DOCUMENTS

| | | | |
|---|---|---|---|
| 5,326,846 A | 7/1994 | Nagai et al. |
| 5,380,724 A | 1/1995 | Zubovics et al. |
| 5,530,061 A | 6/1996 | Sanada et al. |
| 5,541,284 A | 7/1996 | Arnoldi et al. |
| 5,587,449 A | 12/1996 | Fleischer et al. |
| 5,599,860 A | 2/1997 | Memon et al. |
| 5,608,030 A | 3/1997 | Hoffmockel et al. |
| 5,834,542 A | 11/1998 | Kielhorn-Bayer et al. |
| 5,837,744 A | 11/1998 | Nagashima et al. |
| 5,852,135 A | 12/1998 | Kanai et al. |
| 5,859,131 A | 1/1999 | Ishiura et al. |
| 5,866,670 A | 2/1999 | Nakai et al. |
| 5,910,540 A | 6/1999 | Takahashi |
| 5,919,849 A | 7/1999 | Memon et al. |
| 5,942,593 A | 8/1999 | Pudleiner et al. |
| 5,959,036 A | 9/1999 | Yahiro et al. |
| 5,962,623 A | 10/1999 | Eckardt et al. |
| 6,187,859 B1 | 2/2001 | Humphrey et al. |
| 6,271,302 B1 | 8/2001 | Matsushima |
| 6,312,828 B1 | 11/2001 | Akao |
| 6,388,049 B1 | 5/2002 | Yokoyama et al. |
| 6,433,106 B1 | 8/2002 | Mori et al. |
| 6,441,056 B2 | 8/2002 | Keller |
| 6,489,388 B1 | 12/2002 | Kurz et al. |
| 6,506,850 B1 | 1/2003 | Tamimura et al. |
| 6,512,047 B2 | 1/2003 | Kim et al. |
| 6,559,266 B2 | 5/2003 | Kaufhold et al. |
| 6,706,807 B2 | 3/2004 | Kaufhold et al. |
| 6,821,630 B2 | 11/2004 | Takada et al. |
| 6,872,775 B2 | 3/2005 | Greulich et al. |
| 6,936,651 B2 | 8/2005 | Flexman |
| 6,969,651 B1 | 11/2005 | Lu et al. |
| 7,008,986 B2 | 3/2006 | Dames et al. |
| 7,041,718 B2 | 5/2006 | Harashina et al. |
| 7,138,175 B2 * | 11/2006 | Saito .................. 428/304.4 |
| 7,169,887 B2 | 1/2007 | Papke |
| 7,223,809 B2 | 5/2007 | Notorgiacomo |
| 7,329,695 B2 | 2/2008 | Tucker et al. |
| 7,618,714 B2 | 11/2009 | Ziegler et al. |
| 7,644,657 B1 | 1/2010 | Clark et al. |
| 7,645,822 B2 | 1/2010 | Assmann et al. |
| 7,745,548 B2 | 6/2010 | Zierer et al. |
| 7,812,110 B2 | 10/2010 | Haubs et al. |
| 7,829,610 B2 | 11/2010 | Papke |
| 7,858,202 B2 | 12/2010 | Prigandt et al. |
| 7,863,393 B2 | 1/2011 | Assmann et al. |
| 7,906,594 B2 | 3/2011 | Muck et al. |
| 7,915,350 B2 | 3/2011 | Schmalz et al. |
| 7,943,726 B2 | 5/2011 | Haubs et al. |
| 8,008,390 B2 | 8/2011 | Gunnewig et al. |
| 8,128,845 B2 | 3/2012 | Moraczewski et al. |
| 8,236,430 B2 | 8/2012 | Ziegler et al. |
| 8,318,866 B2 | 11/2012 | Kurz et al. |
| 2003/0148117 A1 | 8/2003 | Takada et al. |
| 2004/0118509 A1 | 6/2004 | Flexman et al. |
| 2004/0121175 A1 | 6/2004 | Flexman et al. |
| 2004/0157959 A1 | 8/2004 | Turgis et al. |
| 2004/0228971 A1 | 11/2004 | Scaramuzzino |
| 2005/0043492 A1 | 2/2005 | Chin et al. |
| 2005/0107513 A1 | 5/2005 | Papke |
| 2005/0131124 A1 | 6/2005 | Philippoz et al. |
| 2005/0156351 A1 | 7/2005 | Straus et al. |
| 2005/0173433 A1 | 8/2005 | Spahr |
| 2006/0040120 A1 * | 2/2006 | Ziegler et al. .................. 428/516 |
| 2006/0111507 A1 | 5/2006 | Papke |
| 2006/0151505 A1 | 7/2006 | Kobayashi |
| 2006/0175325 A1 | 8/2006 | Day |
| 2006/0252912 A1 | 11/2006 | Hoffmockel et al. |
| 2007/0010633 A1 | 1/2007 | Park et al. |
| 2007/0049685 A1 | 3/2007 | Hansel et al. |
| 2007/0154727 A1 | 7/2007 | Ziegler et al. |
| 2007/0202332 A1 | 8/2007 | Gunnewig et al. |
| 2007/0264514 A1 | 11/2007 | Prigandt et al. |
| 2008/0029934 A1 | 2/2008 | Ziegler et al. |
| 2008/0214748 A1 | 9/2008 | Assmann et al. |
| 2009/0151707 A1 | 6/2009 | Davis et al. |
| 2009/0189314 A1 | 7/2009 | Peerlings et al. |
| 2009/0220719 A1 | 9/2009 | Klug et al. |
| 2009/0283931 A1 | 11/2009 | Pfeiffer et al. |
| 2011/0086952 A1 | 4/2011 | Bessho et al. |
| 2011/0195148 A1 | 8/2011 | Mentink et al. |
| 2012/0091013 A1 | 4/2012 | Larson et al. |
| 2012/0276314 A1 | 11/2012 | Latz et al. |
| 2013/0082064 A1 | 4/2013 | Larson et al. |

FOREIGN PATENT DOCUMENTS

| | | |
|---|---|---|
| EP | 0565304 | 4/1993 |
| EP | 0354802 A1 | 7/1993 |
| EP | 0420564 B1 | 10/1994 |
| EP | 0654501 | 11/1994 |
| EP | 0716105 | 6/1996 |
| EP | 0999224 A | 5/2000 |
| EP | 0992541 B1 | 9/2004 |
| GB | 1017244 | 7/1962 |
| GB | 1009881 | 11/1965 |
| GB | 1009884 | 11/1965 |
| GB | 1331829 | 9/1973 |
| GB | 1335806 | 10/1973 |
| GB | 1377083 | 12/1974 |
| GB | 1444789 | 8/1976 |
| GB | 524440 | 9/1978 |
| GB | 1524410 | 9/1978 |
| GB | 1590549 | 6/1981 |
| JP | 3284675 | 12/1991 |
| JP | 4114003 | 4/1992 |
| JP | 4145114 | 5/1992 |
| JP | 05-059255 A | 3/1993 |
| JP | 6179673 | 6/1994 |
| JP | 7010871 | 1/1995 |
| JP | 7033766 | 2/1995 |
| JP | 2000-154181 | 6/2000 |
| JP | 2003-147161 | 5/2003 |
| JP | 2004204051 | 7/2004 |
| JP | 2012077258 A | 4/2012 |
| WO | WO 03050187 A1 | 6/2003 |
| WO | WO 2004065444 A1 | 5/2004 |
| WO | WO 2005/012380 A1 | 2/2005 |
| WO | WO 2006-089915 | 8/2006 |
| WO | WO 2006/097486 | 9/2006 |
| WO | WO 2006/105918 | 12/2006 |
| WO | WO 2007/073873 A1 | 5/2007 |
| WO | WO 2007/073874 A1 | 5/2007 |

OTHER PUBLICATIONS

Co-pending U.S. Appl. No. 13/721,268, Malvika Bihari, filed Dec. 20, 2012.

Co-pending U.S. Appl. No. 14/135,699, Bruce Mulholland, filed Dec. 20, 2013.

Braun et al., Influences of structural parameters on the dynamic mechanical properties of polyacetals, Die Arrgewandte Makromolekulare Chemie 228 (1995), pp. 185-200 (Nr. 4030).

Ishida, "Polymerization of Formaldehyde and the Physical Properties of the Polymerization Products, I", Journal of Applied Polymer Science, vol. 26, pp. 2743-2750 (1981).

Kawaguchi et al, Tensile Behavior of Glass-Fiber-Filled Polyacetal:Influence of Functional Groups Polymer Matrices,Journal of Applied Polymer Science, vol. 107,pp. 667-673—2008.

Penczek, et al., Cationic Ring-Opening Polymerization, p. 122, Published 1980.

Kobayashi et al., Molecular Weight Distribution Polyoxymethylene Obtained Solid-State Polymerization, J. Macromol. Sci.—Chem., A., A1(8), pp. 1519-1529, Dec. 1967 abstract.

Mehrabzadeh et al., "Impact Modification of Polyacetal by Thermoplastic Elastomer Polyurethane", Journal of Applied Polymer Science, vol. 84, 2573-2582 (2002).

Chujo et al., "Reversible Gelation of Polyoxazoline by Means of Diels-Alder Reaction", Macromolecules (1990), 23, 2636-2641.

* cited by examiner

HIGH IMPACT RESISTANT POLYOXYMETHYLENE FOR EXTRUSION BLOW MOLDING

CROSS REFERENCE TO RELATED APPLICATION

This application claims filing benefit of U.S. Provisional Patent Application Ser. No. 61/470,742 and European Patent Application No. 11160800.6 both of which have a filing date of Apr. 1, 2011 and are incorporated herein by reference in their entirety.

The present invention relates to a method for the manufacturing of a container or parts of a container for volatile organic compounds (VOC) or compressed gases by extrusion blow molding and container or parts of a container for VOC or compressed gases made by that method.

Fuel tanks for use in vehicles or other mobile devices must generally possess various characteristics and properties. For instance, the fuel tanks should be capable of holding a fuel without significant amounts of fuel vapor escaping. The tanks should also be chemically resistant to the fuel that is to be contained in the tanks. The fuel tanks should also have impact resistance so that they do not rupture during normal use or during collisions and accidents. In the past, conventional fuel tanks were generally made from a metal.

In the relatively recent past, those skilled in the art have attempted to design fuel tanks made from polymers. For instance, many fuel tanks or gas tanks are currently made from high density polyethylene. High density polyethylene has good impact strength resistance properties. The above polymer, however, has a tendency to release fuel vapors or gases from compressed gases over time. Thus, those skilled in the art have been seeking to produce polymer fuel tanks having better permeability properties at similar strength levels.

In this regard, those skilled in the art have proposed using polyester polymers to produce fuel tanks, particularly small fuel tanks. For instance, in U.S. Patent Application Publication No. 2006/0175325, which is incorporated herein by reference, an impact modified polyester is disclosed which comprises a polyester combined with an olefin-vinyl alcohol component and an impact modifier component.

Another type of polymer that has good permeability resistance are polyoxymethylene polymers. Although standard polyoxymethylene polymers have good permeability resistance, the polymers tend to have insufficient impact strength for fuel tank applications due to the high crystallinity of the material. The impact strength of polyoxymethylene polymers can be improved by incorporating an impact modifier into the material. Blending an impact modifier with a polyoxymethylene polymer, however, has a tendency to significantly increase the permeability properties of the polymer. Further, the use of polyoxymethylene polymers in an extrusion blow molding process for the manufacturing of fuel tanks or tanks for compressed gases leads to problems which are associated with the extruded parison. Irregularities in the diameter of the extruded parison lead to inhomogenously formed parts, e.g. walls with significant variation in thickness. This in turn can lead to quality problems or parts in a wall which are more permeable for gas or fuel vapor than other parts of the same wall. Thus, problems have been encountered in being able to develop a molding composition containing a polyoxymethylene polymer for use in producing containers for fuel, such as fuel tanks or containers for compressed gas, such as gas tanks containing gaseous hydrocarbons, e.g. natural gas, methane, ethane, propane or butane and the like or hydrogen.

WO 2007/035371 A1 discloses mono-layered hollow vessels comprising an uncompatibilized, fused blend composition comprising polyoxymethylene, thermoplastic polyurethane and a copolyester. However, the compositions disclosed in WO 2007/035371 A1 suffer from an insufficient homogeneity of the wall thickness when used in a blow molding process for the manufacturing of containers for volatile organic compounds or compressed gases.

WO 2009/127387 A1 discloses compositions comprising polyoxymethylene and thermoplastic elastomers and further additives. However, WO 2009/127387 A1 does not disclose the use of the molding compositions in a blow molding process for the manufacturing of containers for volatile organic compounds or compressed gases.

The object of the invention is the provision of a method for the manufacturing of a container for VOC or compressed gas by extrusion blow molding using a polyoxymethylene based molding composition whereby a uniform extrusion behavior and decreased parison sagging is observed and containers with a homogeneous wall thickness and sufficient impact properties are obtained.

It has been found that polyoxymethylene based molding compositions which demonstrate a sufficient extrudability and which lead to a sufficient homogenously formed parison in an extrusion blow molding process, a sufficient impact resistance, and a sufficient low permeability for volatile organic compounds and compressed gases can be obtained by compositions which comprise at least one polyoxymethylene, at least one thermoplastic elastomer and at least one coupling agent.

The present disclosure is generally directed to volatile organic compound ("VOC") and compressed gas containment devices made from a composition containing a polyoxymethylene polymer. The molding composition used in the method of the invention is formulated to have a unique combination of properties making it well suited for use in constructing various hollow vessels, especially fuel tanks and gas tanks. For instance, the polymer composition does not only have very good impact resistance properties, but is also well suited to preventing fuel vapors and gases from escaping the containment device over time. In particular, the polymer composition can be formulated so as to reduce or prevent VOC vapor or gas emissions while still providing a fuel tank that is capable of not rupturing, even when subjected to relatively high impact forces at colder temperatures. On the other hand the molding composition is suitable to be used in a blow molding process and leads to containers having sufficient homogenously formed parts, especially wall thickness.

An embodiment of the present invention is a method for the manufacturing of a container or parts of a container for volatile organic compounds (VOC) or compressed gases by extrusion blow molding a molding composition comprising:
a) at least one polyoxymethylene (A),
b) at least one impact modifier, preferably a thermoplastic elastomer (B) and
c) at least one coupling agent (C);
wherein the molding composition has
a melt volume rate (MVR) of less than 3 g/10 min, determined according to ISO 1133 at 190° C. and 2.16 kg; and
a Charpy Notched Impact Strength (CNI) at 23° C., determined according to ISO 179-1/1eA (CNI), of higher than 15 kJ/m$^2$, and
a complex shear viscosity $\eta^*$ of higher than 8000 Pas, determined at 0.1 rad/s and 190° C. according to ASTM D4440-08.

The volatile organic compound (VOC) is preferably liquid fuel. The compressed gas is preferably compressed natural gas, methane or hydrogen.

In addition to a polyoxymethylene polymer, the composition further includes an impact modifier and a coupling agent. The impact modifier may comprise, for instance, a thermoplastic elastomer, such as a thermoplastic polyurethane elastomer. The coupling agent, on the other hand, is used to couple the impact modifier to the polyoxymethylene polymer. The coupling agent, for instance, may comprise an isocyanate. For example, in one embodiment, the coupling agent may comprise methylenediphenyl 4,4'-diisocyanate or toluene-2,4-diisocyanate.

The permeation of the molding composition, on the other hand, can be less than about 5 g mm/m$^2$ day at 40° C. when tested according to SAE Test J2665. For instance, the permeation can be less than about 4 g mm/m$^2$ day, such as less than about 3 g mm/m$^2$ day, such as even less than about 2.5 g mm/m$^2$ day. When tested with a 2 mm wall thickness, for instance, the permeation can be less than about 2.5 g/m$^2$ day, such as less than 2 g/m$^2$ day, such as even less than 1.5 g/m$^2$ day. The permeation of compressed gas from the container is preferably less than 0.25 ml per hour and per liter of the container according to ECE R 110.

In the past, various problems were encountered in producing fuel tanks from polyoxymethylene polymers. Although polyoxymethylene polymers have good natural permeability properties, the materials tend not to have acceptable impact strength when used in fuel tank applications due to the high crystallinity of the material. Increasing the impact strength with compatibilized impact modifiers was found to adversely affect the permeability properties of the material. Additionally, it was unexpectedly discovered, however, that by preferably using a polyoxymethylene polymer with a high concentration of hydroxyl end groups and with a low concentration of low molecular weight fractions in combination with an impact modifier that can be chemically reacted with or otherwise attached to the polyoxymethylene polymer, a polymeric material can be produced that has the desired balance of properties with respect to impact strength and permeability as well as extrudability in an extrusion blow molding, i.e. decreased parison sagging.

Component (A):

The molding composition used in the method according to the present invention comprises at least one polyoxymethylene (A) (hereinafter also referred to as "component (A)"). Component (A) of the molding composition according to the invention is a polyoxymethylene homo- or -copolymer. Preferably, the polyoxymethylene (A) has a high content of terminal hydroxyl groups and more preferably contains no low molecular weight constituents or only a small proportion thereof. Polyoxymethylene (A) preferably has terminal hydroxyl groups, for example hydroxyethylene groups (—OCH$_2$CH$_2$—OH) and hemi-acetal groups (—OCH$_2$—OH). According to a preferred embodiment, at least 25%, preferably at least 50%, more preferably at least 75%, even more preferably at least 85% and especially at least 90% of the terminal groups of the polyoxymethylene (A) are hydroxyl groups, especially hydroxyethylene groups.

The content of terminal hydroxyl groups and/or hydroxyl side groups (also referred to together as "terminal hydroxyl groups") is especially preferred at least 80%, especially at least 90%, based on all terminal groups. Within the meaning of the present invention, the term "all terminal groups" is to be understood as meaning all terminal and—if present—all side terminal groups.

In addition to the terminal hydroxyl groups, the POM may also have other terminal groups usual for these polymers. Examples of these are alkoxy groups, formate groups, acetate groups or aldehyde groups. According to a preferred embodiment of the present invention the polyoxymethylene (A) is a homo- or copolymer which comprises at least 50 mol-%, preferably at least 75 mol-%, more preferably at least 90 mol-% and most preferably at least 95 mol-% of —CH$_2$O- repeat units.

It has been found that molding compositions which demonstrate an extremely high impact resistance can be obtained with a polyoxymethylene (A) which has low molecular weight constituents having molecular weights below 10,000 Dalton of less than 15% by weight, preferably less than 10% by weight, more preferably less than 5% by weight and most preferably less than 2% by weight, based on the total mass of the polyoxymethylene.

The "POM polymers" which can be used as polyoxymethylene (A) generally have a melt volume rate MVR of less than 15 cm$^3$/10 min, preferably ranging from 0.1 to 10 cm$^3$/10 min, more preferably ranging from 0.4 to 5 cm$^3$/10 min and especially ranging from 0.5 to 3 cm$^3$/10 min, e.g. 0.6 to 2 cm$^3$/10 min determined according to ISO 1133 at 190° C. and 2.16 kg.

Preferably, polyoxymethylene (A) has a content of terminal hydroxyl groups of at least 5 mmol/kg, preferably at least 10 mmol/kg, more preferably at least 15 mmol/kg and most preferably ranging from 18 to 40 mmol/kg, especially 20 to 30 mmol/kg.

The content of terminal hydroxyl groups can be determined as described in K. Kawaguchi, E. Masuda, Y. Tajima, Journal of Applied Polymer Science, Vol. 107, 667-673 (2008).

The preparation of the polyoxymethylene (A) can be carried out by polymerization of polyoxymethylene-forming monomers, such as trioxane or a mixture of trioxane and dioxolane and/or butanediol formal in the presence of a molecular weight regulator such as ethylene glycol or methylal. The polymerization can be effected as precipitation polymerization or in particular in the melt. Initiators which may be used are the compounds known per se, such as trifluoromethane sulfonic acid, these preferably being added as solution in ethylene glycol to the monomer. The procedure and termination of the polymerization and working-up of the product obtained can be effected according to processes known per se. By a suitable choice of the polymerization parameters, such as duration of polymerization or amount of molecular weight regulator, the molecular weight and hence the MVR value of the resulting polymer can be adjusted. The criteria for choice in this respect are known to the person skilled in the art. The above-described procedure for the polymerization leads as a rule to polymers having comparatively small proportions of low molecular weight constituents. If a further reduction in the content of low molecular weight constituents were to be desired or required, this can be effected by separating off the low molecular weight fractions of the polymer after the deactivation and the degradation of the unstable fractions after treatment with a basic protic solvent.

This may be a fractional precipitation from a solution of the stabilized polymer, polymer fractions of different molecular weight distribution being obtained.

Preference is also given to polyoxymethylene (A) which also is obtainable by polymerizing polyoxymethylene forming monomers in the presence of heteropoly acids.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. It has been discovered that the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than 2% by weight.

The heteropoly acid is a generic term for polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

$$H_x[M_mM'_nO_z]·yH_2O \qquad a.$$

wherein
M represents an element selected from the group consisting of P, Si, Ge, Sn, As, Sb, U, Mn, Re, Cu, Ni, Ti, Co, Fe, Cr, Th and Ce,
M' represents an element selected from the group consisting of W, Mo, V and Nb,
m is 1 to 10,
n is 6 to 40,
z is 10 to 100,
x is an integer of 1 or above, and
y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

(ROOC)—(CH$_2$)$_n$—(COOR')

wherein
n is an integer from 2 to 12, preferably 3 to 6 and
R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

(ROOC)$_2$—CH—(CH$_2$)$_m$—CH—(COOR')$_2$ wherein
m is an integer from 0 to 10, preferably from 2 to 4 and
R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are selected from the group consisting of dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

Further, polyoxymethylene (A) can also be a conventional oxymethylene homopolmyer and/or oxymethylene copolymer. As component (A) polyoxymethylenes are described for example in DE-A-2947490 which are generally unbranched linear polymers which contain as a rule at least 80%, preferably at least 90%, oxymethylene units (—CH$_2$—O—). As mentioned before, the term polyoxymethylenes comprises both, homopolymers of formaldehyde or its cyclic oligomers, such as trioxane or 1,3,5,7-tetraoxacyclooctane, and corresponding copolymers. For example the follwing components can be used in the polymerization process: ethyleneoxide, 1,2-propyleneoxide, 1,2-butyleneoxide, 1,3-butyleneoxide, 1,3-dioxane, 1,3-dioxolane, 1,3-dioxepane and 1,3,6-trioxocane as cyclic ethers as well as linear oligo- or polyformales, like polydioxolane or polydioxepane.

Further, functionalized polyoxymethylenes which are prepared by copolymerization of trioxane and the formal of trimethylolpropane (ester), of trioxane and the alpha, alpha and the alpha, beta-isomers of glyceryl formal (ester) or of trioxane and the formal of 1,2,6-hexantriol (ester) can be used as polyoxymethylene (A).

Such POM homo- or copolymers are known per se to the person skilled in the art and are described in the literature.

The molding composition used in the method of the present invention preferably comprises polyoxymethylene (A) in an amount of up to 95 wt.-%, preferably ranging from 40 to 90 wt.-%, more preferably ranging from 50 to 90 wt.-%, especially preferably ranging from 60 to 90 wt.-%, wherein the weight is based on the total weight of the molding composition.

Component (B):

The molding composition used in the method of the present invention further comprises at least one impact modifier, preferably a thermoplastic elastomer (B) (hereinafter also referred to as component (B)).

Thermoplastic elastomers (B) are impact modifiers which are components which are added to and incorporated in the polyoxymethylene (A) matrix to improve the impact resistance of the finished product to resist sudden pulses or shocks.

Preference is given to molding compositions which comprise at least one thermoplastic elastomer which is selected from the group consisting of thermoplastic polyester elastomer (TPE-E), thermoplastic polyamide elastomer (TPE-A), thermoplastic polystyrene elastomer (TPE-S) which can be functionalized, thermoplastic polyolefin elastomer (TPE-O) which can be functionalized, thermoplastic polyurethane elastomer (TPE-U) and mixtures thereof.

These thermoplastic elastomers usually have active hydrogen atoms which can be reacted with the coupling agent (C). Examples of such groups are urethane groups, amido groups, amino groups or hydroxyl groups, for example of terminal polyester diol flexible segments of thermoplastic polyurethane elastomers which have hydrogen atoms which can react, for example, with isocyanate groups. The presence of the coupling agent (C) is essential since the notched impact strength of the molded compositions can be increased and the extrudability and the formation of homogenously formed parison is improved.

Thermoplastic copolyesters are commercially available as Riteflex®, Hytrel® or Arnitel® or other trade names, thermoplastic polyurethanes (TPE-U) are commercially available as Elastollan®, Desmopan®, Estane®, Pearlthane® or other tradenames.

Especially good results could be achieved with thermoplastic polyurethanes (TPE-U).

In one particular embodiment, a thermoplastic polyurethane elastomer is used as the impact modifier either alone or in combination with other impact modifiers. The thermoplastic polyurethane elastomer, for instance, may have a soft segment of a long-chain diol and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain dials are polyester diols such as poly(butylene adipate)diol, poly(ethylene adipate)diol and poly($\epsilon$-caprolactone)diol; and polyether diols such as poly(tetramethylene ether)glycol, polypropylene oxide) glycol and poly(ethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate), wherein 4,4'-methylenebis(phenyl isocyanate) and 2,4-toluene diisocyanate are preferred. Suitable chain extenders are $C_2$-$C_6$ aliphatic diols such as ethylene glycol, 1,4-butanediol, 1,6-hexanediol and neopentyl glycol. One example of a thermoplastic polyurethane is characterized as essentially poly (adipic acid-co-butylene glycol-co-diphenylmethane diisocyanate).

Preference is given to a molding composition wherein the thermoplastic elastomer (B) is present in an amount of 3 wt.-% to 50 wt.-%, preferably 5 wt.-% to 40 wt.-%, more preferably 10 to 30 wt.-%, especially 11 to 25 wt.-%, wherein the weight is based on the total weight of the composition.

Component (C):

The molding composition used in the method of the present invention comprises at least one coupling agent (C) (herein after also referred to as component (C)).

The coupling agent provides a linkage between the nucleophilic groups in the molding composition.

The coupling agent present in the polymer composition comprises a coupling agent capable of coupling the impact modifier to the polyoxymethylene polymer. In order to form bridging groups between the polyoxymethylene polymer and the impact modifier, a wide range of polyfunctional, such as trifunctional or bifunctional coupling agents, may be used. The coupling agent may be capable of forming covalent bonds with the terminal hydroxyl groups on the polyoxymethylene polymer and with active hydrogen atoms on the impact modifier. In this manner, the impact modifier becomes coupled to the polyoxymethylene through covalent bonds.

In a preferred embodiment, the coupling agent (C) is a polyisocyanate, preferably an organic diisocyanate, more preferably selected from the group consisting of aliphatic diisocyanates, cycloaliphatic diisocyanates, aromatic diisocyanates and mixtures thereof.

In one embodiment, the coupling agent comprises a diisocyanate, such as an aliphatic, cycloaliphatic and/or aromatic diisocyanate. The coupling agent may be in the form of an oligomer, such as a trimer or a dimer.

According to a preferred embodiment the coupling agent (C) is a diisocyanate or triisocyanate selected from 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis (isocyanatomethyl)-cyclohexane diisocyanate; 4,4'-bis (isocyanatomethyl)dicyclohexane; 2,4'-bis (isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trinnethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclohexyl isocyanate, dicyclohexylrnethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

According to further preferred embodiment the coupling agent (C) is selected from the group consisting of derivatives of carbonic acid, especially carbonic acid ester, activated urea derivatives, ester or half ester of dicarboxylic acids, dianhydrides, diimides and mixtures thereof.

Especially preferred are aromatic polyisocyanates, such as 4,4'-diphenylmethane diisocyanate (MDI).

Preferably, the molding composition of the present invention comprises the coupling agent (C) in an amount ranging from 0.1 to 5 wt.-%, preferably ranging from 0.2 to 4 wt.-% and more preferably ranging from 0.3 to 3.0 wt.-%, especially 0.4 to 2.0 wt.-%, wherein weight-% is based on the total weight of the composition.

The molding composition used in the method of the present invention can optionally contain a stabilizer and/or various other known additives. Such additives can include, for example, antioxidants, acid scavengers, formaldehyde scavengers, UV stabilizers or heat stabilizers. In addition, the molding material or the molding may contain processing auxiliaries, for example adhesion promoters, lubricants, nucleating agents, demolding agents, fillers, reinforcing materials or antistatic agents and additives which impart a desired property to the molding material or to the molding, such as dyes and/or pigments and/or further impact modifiers and/or additives imparting electrical conductivity; and mixtures of these additives, but without limiting the scope to said examples.

In general, other additives can be present in the molding composition in an amount up to about 10% by weight, such as from about 0.1% to about 5% by weight, such as from about 0.1 to about 2% by weight, When forming containment devices or parts thereof by extrusion blow molding in accordance with the present invention the above described components can be melt blended together, which automatically causes the reaction to occur between the coupling agent, the polyoxymethylene polymer, and the thermoplastic elastomer. As described above, the coupling agent may react with the active end groups on the polyoxymethylene polymer and the impact modifier. The reaction between the components can occur simultaneously or in sequential steps. In one particular embodiment, the components in the composition are mixed together and then melt blended in an extruder.

The reaction of the components is typically effected at temperatures of from 100 to 260° C., preferably from 150 to 220° C., and the duration of reaction is typically from 0.2 to 60 minutes.

The proportion of coupling agent can be chosen within wide limits. Preferably, coupling agent is used in an amount such that there are from 0.2 to 5.0 mol, preferably from 0.5 to 4.0 mol, of the coupling agent per mole of active hydrogen atoms, for example in the form of hydroxyl groups, of the polyoxymethylene containing active hydrogen atoms.

The further processing of the molding materials can be effected by mixing the finely divided, for example pulverulent or granulated, components and subsequent thermoplastic processing or by mixing the components in heatable mixing units suitable for this purpose. Suitable mixing units and mixing processes are described, for example, in: Saechtling, Kunststoff-Taschenbuch [Plastics Handbook], Hanser Verlag, 27th edition 1998, on pages 202 to 217, which is hereby incorporated by reference.

In one embodiment, the molding composition of the present disclosure is reacted together and compounded prior to being used in a molding process. For instance, in one embodiment, the different components can be melted and mixed together in a conventional single or twin screw extruder at a temperature described above. Extruded strands may be produced by the extruder which are then pelletized. Prior to compounding, the polymer components may be dried to a moisture content of about 0.05 weight percent or less. If desired, the pelletized compound can be ground to any suitable particle size, such as in the range of from about 100 microns to about 500 microns.

The Charpy Notched Impact Strength (CNI) of the molding composition used in the method of the invention is higher than 15 kJ/m$^2$. According to a preferred embodiment the molding composition used in the method of the invention has a Charpy Notched Impact Strength (CNI) at 23° C. determined according to ISO 179-1/1eA (CNI) of higher than 20 kJ/m$^2$, further preferably higher than 25 kJ/m$^2$, preferably higher than 30 kJ/m$^2$, further preferably higher than 40 kJ/m$^2$, more preferably ranging from 25 to 200 kJ/m$^2$, most preferably ranging from 26 to 150 kJ/m$^2$, especially preferably ranging from 30 to 130 kJ/m$^2$.

The fuel container or gas container should have a sufficient impact resistance at low temperatures in order to make them suitable for use in the automotive industry. According to a preferred embodiment the molding composition used in the method of the invention has a Charpy Notched Impact Strength (CNI) at −40° C. determined according to ISO 179-1/1eA (CNI) of higher than 10 kJ/m$^2$, preferably ranging from 11 to 80 kJ/m$^2$, more preferably ranging from 12 to 60 kJ/m$^2$, further preferably ranging from 13 to 40 kJ/m$^2$ and especially ranging from 14 to 30 kJ/m$^2$.

It has been found that the melt volume rate (MVR) of the molding composition is decisive for obtaining a homogenous wall thickness of the container. The melt volume rate (MVR) of the molding composition used in the extrusion blow molding process is less than 3 g/10 min, determined according to ISO 1133 at 190° C. and 2.16 kg. According to a preferred embodiment the molding composition has a melt volume rate (MVR) of less than 2.5 g/10 min, preferably ranging from 0.005 to 2.5 g/10 min, more preferably ranging from 0.005 to 2.0 g/10 min, especially ranging from 0.005 to 1.5 g/10 min, determined according to ISO 1133 at 190° C. and 2.16 kg.

The molding composition used in the method of the present invention has a complex shear viscosity η* of higher than 8000 Pas, determined at 0.1 rad/s and 190° C. according to ASTM D4440-08.

The complex shear viscosity η* is decisive for the molding composition to be used in the method of the present invention since a too low complex shear viscosity leads to problems in the method for the manufacturing of the containers by extrusion blow molding. A too low complex shear viscosity leads to a too low relative parison diameter and, as a consequence, the differences in the wall thicknesses of the container parts become too large.

According to a preferred embodiment of the method of the invention the molding composition has a complex shear viscosity η* which is ranging between 8100 and 100000 Pas, preferably 10000 to 100000, more preferably ranging between 15000 and 90000 and especially between 20000 and 85000 Pas.

The complex shear viscosity η* has been determined on a ARES-G2 Rheometer from TA Instruments.

The measurements have been carried out with a dynamic frequency sweep at 0.1 rad/sec, with 3% strain amplitude, at 190° C.

Of particular advantage, the molding composition is capable of forming a monolayer tank without having to apply any further coatings or layers to the container wall for increasing either impact resistance or permeability resistance.

For instance, molding compositions made in accordance with the present disclosure preferably have a permeation of less than 5 g mm/m$^2$ per day at 40° C. when tested according to SAE Test J2665. SAE Test J2665 tests the permeability of the material with a test fuel comprising 10% ethanol, 45% toluene, and 45% iso-octane. Determination of the steady-state flux reported in gmm/m$^2$ per day is carried out per SAE Test J2665, Section 10. In certain embodiments, the molding composition is capable of producing a polymer material having a permeation of less than 4 g mm/m$^2$ per day, such as less than 3 g mm/m$^2$ per day, such as even less than 2.5 g mm/m$^2$ per day. When tested according to a 2 mm wall thickness, such as according to SAE Test J2665, Section 11, the molding composition of the present disclosure preferably has a permeation of less than about 2.5 g/m$^2$ per day, such as less than 2 g/m$^2$ per day, such as even less than 1.5 g/m$^2$ per day.

The permeation of compressed natural gas from gas containers made according to the method of the invention is preferably less than 0.25 ml/(l*h) determined at 200 bar and 23° C. according to ECE R 110.

It can now be shown that by the method of the invention containers with a volume of 40 liters and a uniform wall thickness of 2 mm could be obtained that exhibit a permeation for compressed natural gas(es) of less than 0.25 ml/(l*h) determined at 200 bar and 23° C. according to ECE R 110.

The extrusion blow molding process is known to the person skilled in the art.

In general the blow molding process begins with melting the molding composition and forming it into a parison. Single screw extruders with the appropriate screw design are used to convert the composition (usually pellets) into a homogeneous melt. Depending on the melt strength one can use the composition with the regular classic extrusion blow molding process. This applies for the composition with a max. parison length of 250 to 300 mm. For larger parison length it might be necessary to use the extrusion blow molding process with an additional accumulator head. The size of the head depends on the amount of material to form a specific container size and wall thickness.

The basic process has two fundamental phases. Initially, the parison itself (parison means tube-like piece of plastic) is extruded vertically out of the die. Once the parison settles on the injector pin (air injector), the mold is closed. In the second phase air is injected into the tube and blown up till it reaches the wall of the tool.

The pressure is generally held until the melt solidifies. Another key factor for this process is to achieve components with a homogenous wall thickness distribution throughout the whole component/parison length. This is achieved with the so-called wall thickness control feature (WDS) at the die head. In general this feature means a programming step to establish an extrusion/wall thickness profile while the parison is ejected from the accumulator head.

However, this feature can only work with the appropriate molding composition. The composition to be used in the method of the invention has been specially developed to run hollow components with a homogenous wall thickness distribution using the WDS feature which is a basic requirement for blow molders/converters.

A further embodiment of the present invention is a container or parts of a container for volatile organic compounds or compressed gases obtainable by the method according to the invention.

Preferably, the container is a fuel tank or a gas tank.

Although the polymer composition of the present disclosure can be used in an extrusion blow molding process to produce any suitable type of containment devices for VOCs, e.g. fuel tanks, the polymer composition is particularly well suited to producing fuel tanks for a category of engines referred to as small off-road engines. Such engines typically have a power rating of up to 25 horsepower and are used in various vehicles and mobile devices. For instance, small off-road engines are typically used in small utility equipment, lawn mowers, weed trimmers, chain saws, motorcycles, lawn tractors, blowers, and the like. Such fuel tanks typically have a fuel capacity of less than 80 liter, and particularly less than 20 liter.

Of particular advantage, the fuel tank can comprise of only a monolayer of the polymer composition. The container wall can generally have a thickness of from about 0.5 mm to about 10 mm, such as from about 1.5 mm to about 5 mm.

It should be understood, however, that other products and articles in addition to fuel tanks may be made in accordance with the present disclosure. In particular, any type of VOC or compressed gas containment device may be made in accordance with the present disclosure. As used herein, a "containment device" refers to any hollow article that is designed to contain or in any way come in contact with VOCs and/or compressed gases. In addition to tanks, for instance, a containment device may comprise a tube, a hose, or any other similar device. The containment device, for instance, may be designed to contact or contain any hydrocarbon fluid, pesticides, herbicides, brake fluid, paint thinners, and various compressed hydrocarbon gases, such as natural gas, methane, ethane, propane, and the like or hydrogen. When used as a fuel tank, the containment device may contact or contain any suitable hydrocarbon fluid, whether liquid or gas.

EXAMPLES

The following components were used in the examples:

POM 1: Linear POM copolymer with 3.0 wt % dioxolane (1.23 mol % as EO) incorporated in the backbone; portion of components having a low molecular weight: 4-10% by weight; portion of terminal OH groups: 6-10 mmol/kg, MVR at 190° C./2.16 kg: 1.8 cm$^3$/10 min POM 2: Linear POM copolymer with 3.0 wt % dioxolane (1.23 mol % as EO) incorporated in the backbone; portion of components having a low molecular weight; 4-10% by weight; portion of terminal OH groups: 20-30 mmol/kg, MVR at 190° C./2.16 kg: 1.8 cm$^3$/10 min POM 3: Linear POM copolymer with 3.0 wt % dioxolane (1.23 mol % as EO) incorporated in the backbone; portion of components having a low molecular weight: 2% by weight; portion of terminal OH groups: 20-30 mmol/kg, MVR at 190° C./2.16 kg: 8.0 cm$^3$/10 min POM 4: Branched POM terpolymer with 3.0 wt % dioxolane (1.23 mol % as EO) and 0.08 wt % BDGE (1,4-Butanedioldiglycidylether) incorporated in the backbone; portion of components having a low molecular weight: 4-10% by weight; portion of terminal OH groups: 6-10 mmol/kg, MVR at 190° C./2.16 kg: 1.1 cm$^3$/10 min MDI: Methylenediphenyl-4,4' diisocyanate (MDI)

TDI: Toluene-2,4-diisocyanate (TDI)

TPU 1: thermoplastic polyurethane elastomer, Desmopan® 385 S ex Bayer Material Science, Germany, MVR at 200° C./2.16 kg: 4.2 cm$^3$/10 min TPU 2: thermoplastic polyurethane elastomer; Elastollan® B 85 A 10 ex BASF, Germany, MVR at 200° C./2.16 kg: 8.1 cm$^3$/10 min TPE-E: thermoplastic polyester elastomer; Riteflex 430 ex Ticona TPE-A: thermoplastic elastomer made of flexible polyether and rigid polyamide; PEBAX® 2533 ex ARKEMA, France.

Unless indicated otherwise all determinations have been carried out at room temperature (23° C.).

The testing of the prepared molding compositions was affected according to the following standards:

Melt volume rate (MVR) (190° C.; 2.16 kg): ISO 1133;

Charpy notched impact strength: ISO 179-1/1eA (CNI);

Portion of terminal OH groups in POM has been determined as described in K. Kawaguchi, E. Masuda, Y. Tajima, Journal of Applied Polymer Science, Vol. 107, 667-673 (2008).

Portion of components having a low molecular weight refers to the portion of the polymer having a molecular weight below 10000 Dalton.

The amounts referred to in the tables which follow are in wt.-%, based on the total weight of the composition.

To determine the melt strength of the molding composition an extrusion blow molding machine without accumulator was used to produce a continuous parison under constant conditions. The extruder used had a screw diameter of 50 mm and a length of 1 m (L:D=20) driven by a Combidrive Varimax Type VMU-50 from Axel Povelson Mashinenfabrik, Roskilde, Denmark. The machine had four heating zones which were set at 200° C., 200° C., 195° C., 195° C. The head (die) was set at 190° C. The length of the side-fed tube die was 260 mm. The die had an outer diameter of 47 mm and an inner diameter of the arbor of 45 mm. The screw was a standard progression screw. The screw speed was 32 rounds per minute. The throughput rates were at about 20 kg/h. The melt parison was continuously pressed out with a pump. The parison was cut off manually between different test runs. Then the parison was extruded downwards. The blow mold was not closed during the extrusion process in order to observe the parison with a video camera during the extrusion process. The parison extrusion time from the die to the top of the mold (length: 18 cm) as well as the extrusion time from the top of the mold to the bottom of the mold (24 cm) has been determined by video. By parison sagging due to its own weight the extrusion time between the top of the mold and the bottom of the mold becomes shorter.

Further, the parison outer diameter at the top of the mold (b1) and the diameter of the parison at the die (b2) have been determined when the melt front reached the bottom of the mold.

The relative parison diameter [%] has been calculated as follows: (b1/b2)*100.

The higher the relative parison diameter [%] the less deformation of the parison by parison sagging.

The less the parison sagging the more homogenous is the wall thickness in the blow molding step.

As can be seen from the examples the use of a coupler (component C) does not only improve the Charpy notched impact strength (CNI) but also reduce the parison sagging in extrusion molding (increased relative parison diameter).

Comparative example 10 fulfills blow molding requirements but not impact requirements.

TABLE 1

Different molding compositions

| Example | POM/% | MDI % | TPU 1 % | TPU 2 % | MVR (190° C./2.16 kg) cm$^3$/10 min | CNI (23° C.) mJ/mm$^2$ | CNI(−40° C.) mJ/mm$^2$ |
|---|---|---|---|---|---|---|---|
| 1 (comparative) | POM 2/100 | | | | 1.83 | 7.5 | 6.4 |
| 2 (comparative) | POM 2/80 | | 20 | | 1.80 | 20.2 | 9.3 |
| 3 | POM 2/79.5 | 0.5 | 20 | | 0.82 | 26.5 | 11.0 |
| 4 (comparative) | POM 2/70 | | 30 | | 1.76 | 56.9 | 11.4 |
| 5 | POM 2/69.2 | 0.8 | 30 | | 0.34 | 121.9 | 16.6 |
| 6 (comparative) | POM 2/60 | | 40 | | 1.95 | 73.9 | 20.7 |
| 7 | POM 2/59 | 1.0 | 40 | | 0.28 | 148.5 | 16.5 |
| 8 | POM 2/81.5 | 0.5 | | 18 | 1.42 | 18.5 | 10.5 |
| 9 | POM 2/69.2 | 0.8 | | 30 | 1.17 | 79.3 | 20.2 |
| 10 (comparative) | POM 4/100 | | | | 1.11 | 10.7 | 5.9 |

TABLE 2

Properties of the extruded parison

| Example | POM/% | MDI % | TPU 1 % | TPU 2 % | MVR (190° C./2.16 kg) cm³/10 min | Complex shear viscosity η* at 190° C. and 0.1 rad/s Pas | Extrusion time die to top of mold s | Extrusion time top of mold to bottom s | Relative Parison diameter % |
|---|---|---|---|---|---|---|---|---|---|
| 1 (comparative) | POM 2/100 | | | | 1.83 | 5477 | 20.0 | 4.5 | 31 |
| 2 (comparative) | POM 2/80 | | 20 | | 1.80 | 5493 | 32.5 | 7.0 | 46 |
| 3 | POM 2/79.5 | 0.5 | 20 | | 0.82 | 53438 | 24.0 | 8.0 | 54 |
| 4 (comparative) | POM 2/70 | | 30 | | 1.76 | 7283 | 30.0 | 6.0 | 38 |
| 5 | POM 2/69.2 | 0.8 | 30 | | 0.34 | 33653 | 29.5 | 12.5 | 58 |
| 6 (comparative) | POM 2/60 | | 40 | | 1.95 | 6193 | 28.0 | 5.0 | 46 |
| 7 | POM 2/59 | 1.0 | 40 | | 0.28 | 48595 | 32.0 | 9.5 | 50 |
| 8 | POM 2/81.5 | 0.5 | | 18 | 1.42 | 8242 | 30.0 | 6.0 | 50 |
| 9 | POM 2/69.2 | 0.8 | | 30 | 1.17 | 11500 | 27.5 | 5.0 | 46 |
| 10 (comparative) | POM 4/100 | | | | 1.11 | 18676 | 20.5 | 9.5 | 56 |

TABLE 3

Different molding compositions

| Examples | POM/% | MDI % | TDI % | TPU 1 % | TPU 2 % | TPE-E % | TPE-A % | MVR (190° C./2.16 kg) cm³/10 min | CNI (23° C.) mJ/mm² | CNI (−40° C.) mJ/mm² |
|---|---|---|---|---|---|---|---|---|---|---|
| 11 (comparative) | POM 2/70 | | | | | 30 | | 4.94 | 8.9 | 7.0 |
| 12 (comparative) | POM 2/69.2 | 0.8 | | | | 30 | | 1.38 | 14.9 | 10.2 |
| 13 (comparative) | POM 2/70 | | | | | | 30 | 4.25 | 7.2 | 6.1 |
| 14 (comparative) | POM 2/69.2 | 0.8 | | | | | 30 | 2.35 | 7.2 | 5.9 |
| 15 (comparative) | POM 2/70 | | | | 30 | | | 3.33 | 18.3 | 7.1 |
| 16 | POM 2/69.2 | 0.8 | | | 30 | | | 0.99 | 94.1 | 12.9 |
| 17 | POM 2/69.45 | | 0.55 | | 30 | | | 2.20 | 23.9 | 12.8 |
| 18 (comparative) | POM 2/82 | | | | 18 | | | 2.57 | 16.6 | 10.1 |
| 19 (comparative) | POM 1/82 | | | | 18 | | | 2.70 | 18.8 | 12.4 |
| 20 | POM 1/81.5 | 0.5 | | | 18 | | | 1.45 | 20.7 | 9.3 |
| 21 (comparative) | POM 2/70 | | | | 30 | | | 2.75 | 37.6 | 9.8 |
| 22 | POM 1/69.2 | 0.8 | | | 30 | | | 0.85 | 118.1 | 11.6 |
| 23 (comparative) | POM 1/70 | | | | 30 | | | 2.80 | 45.7 | 8.6 |

TABLE 4

Properties of the extruded parison

| Samples | POM/% | MDI % | TDI % | TPU 1 % | TPU2 % | TPE-E % | TPE-A % | MVR (190° C./2.16 kg) cm³/10 min | Complex shear viscosity η* at 0.1 rad/s and 190° C. Pas | Extrusion time die to top of mold s | Extrusion time top of mold to bottom s | Relative Parison diameter % |
|---|---|---|---|---|---|---|---|---|---|---|---|---|
| 11 (comparative) | POM 2/70 | | | | | 30 | | 4.94 | 2592 | 21.5 | 3.0 | 37 |
| 12 (comparative) | POM 2/69.2 | 0.8 | | | | 30 | | 1.38 | 14854 | 32.5 | 8.0 | 42 |
| 13 (comparative) | POM 2/70 | | | | | | 30 | 4.25 | 4231 | 28.5 | 3.5 | 38 |
| 14 (comparative) | POM 2/69.2 | 0.8 | | | | | 30 | 2.35 | 7069 | 29.5 | 6.0 | 44 |
| 15 (comparative) | POM 2/70 | | | | 30 | | | 3.33 | 4192 | 25.5 | 3.0 | 31 |

TABLE 4-continued

Properties of the extruded parison

| Samples | POM/% | MDI % | TDI % | TPU 1 % | TPU2 % | TPE-E % | TPE-A % | MVR (190° C./2.16 kg) cm³/10 min | Complex shear viscosity η* at 0.1 rad/s and 190° C. Pas | Extrusion time die to top of mold s | Extrusion time top of mold to bottom s | Relative Parison diameter % |
|---|---|---|---|---|---|---|---|---|---|---|---|---|
| 16 | POM 2/69.2 | 0.8 | | | 30 | | | 0.99 | 22684 | 25.5 | 6.5 | 54 |
| 17 | POM 2/69.45 | | 0.55 | | 30 | | | 2.20 | 11540 | 25.5 | 5.0 | 46 |
| 18 (comparative) | POM 2/82 | | | | 18 | | | 2.57 | 6355 | 26.0 | 5.0 | 42 |
| 19 (comparative) | POM 1/82 | | | | 18 | | | 2.70 | 5785 | 24.0 | 4.0 | 42 |
| 20 | POM 1/81.5 | 0.5 | | | 18 | | | 1.45 | 12190 | 20.0 | 4.5 | 50 |
| 21 (comparative) | POM 2/70 | | | | 30 | | | 2.75 | 7369 | 22.5 | 4.0 | 37 |
| 22 | POM 1/69.2 | 0.8 | | | 30 | | | 0.85 | 17111 | 28.7 | 6.0 | 50 |
| 23 (comparative) | POM 1/70 | | | | 30 | | | 2.80 | 6650 | 21.0 | 3.5 | 35 |

TABLE 5

Different molding compositions

| Examples | POM/% | MDI % | TDI % | TPU 1 % | TPU 2 % | TPE-E % | TPE-A % | MVR (190° C./2.16 kg) cm³/10 min | CNI (23° C.) mJ/mm² | CNI (−40° C.)5 mJ/mm² |
|---|---|---|---|---|---|---|---|---|---|---|
| 24 | POM 3/80 | 2.0 | | | 18 | | | 1.40 | 26.6 | 10.3 |
| 25 (comparative) | POM 3/86 | 1.0 | | | 13 | | | 3.47 | 17.2 | 12.4 |
| 26 | POM 3/84 | 3.0 | | | 13 | | | 1.10 | 15.6 | 10.2 |
| 27 (comparative) | POM 3/76 | 1.0 | | | 23 | | | 2.12 | 23.7 | 10.6 |
| 28 | POM 3/74 | 3.0 | | | 23 | | | 0.59 | 31.3 | 13.0 |
| 29 | POM 3/79 | 3.0 | | | 18 | | | 1.55 | 25.5 | 13.6 |
| 30 (comparative) | POM 3/85 | 2.0 | | | 13 | | | 3.05 | 21.6 | 10.8 |
| 31 | POM 3/75 | 2.0 | | | 23 | | | 1.00 | 33.8 | 11.9 |
| 32 (comparative) | POM 2/21.4 POM 3/64.6 | 1.0 | | | 13 | | | 2.85 | 18.8 | 10.9 |
| 33 (comparative) | POM 2/42.8 POM 3/43.2 | 1.0 | | | 13 | | | 2.38 | 21.8 | 10.7 |

TABLE 6

Properties of the extruded parison

| Examples | POM/% | MDI % | TDI % | TPU 1 % | TPU 2 % | TPE-E % | TPE-A % | MVR (190° C./2.16 kg) cm³/10 min | Complex shear viscosity η* at 0.1 rad/s at 190° C. Pas | Extrusion time die to top of mold s | Extrusion time top of mold to bottom s | Relative Parison diameter % |
|---|---|---|---|---|---|---|---|---|---|---|---|---|
| 24 | POM 3/80 | 2.0 | | | 18 | | | 1.40 | 10437 | 19.0 | 5.3 | 46 |
| 25 (comparative) | POM 3/86 | 1.0 | | | 13 | | | 3.47 | 3286 | 17.0 | 2.0 | 35 |
| 26 | POM 3/84 | 3.0 | | | 13 | | | 1.10 | 10078 | 22.0 | 8.7 | 61 |
| 27 (comparative) | POM 3/76 | 1.0 | | | 23 | | | 2.12 | 7867 | 18.5 | 2.5 | 38 |
| 28 | POM 3/74 | 3.0 | | | 23 | | | 0.59 | 20326 | 20.3 | 10.3 | 65 |
| 29 | POM 3/79 | 3.0 | | | 18 | | | 1.55 | 11794 | 21.7 | 5.7 | 50 |
| 30 (comparative) | POM 3/85 | 2.0 | | | 13 | | | 3.05 | 5468 | 20.5 | 4.0 | 43 |
| 31 | POM 3/75 | 2.0 | | | 23 | | | 1.00 | 17371 | 19.7 | 6.0 | 50 |
| 32 (comparative) | POM 2/21.4 POM 3/64.6 | 1.0 | | | 13 | | | 2.85 | 4375 | 19.3 | 3.3 | 37 |
| 33 (comparative) | POM 2/42.8 POM 3/43.2 | 1.0 | | | 13 | | | 2.38 | 5448 | 20.3 | 4.3 | 42 |

TABLE 7

Different molding compositions

| Examples | POM/% | MDI % | TDI % | TPU 1 % | TPU 2 % | TPE-E % | TPE-A % | MVR (190° C./2.16 kg) cm³/10 min | CNI (23° C.) mJ/mm² | CNI (−40° C.) mJ/mm² |
|---|---|---|---|---|---|---|---|---|---|---|
| 34 | POM 2/68.4 | 1.6 | | | 30 | | | 0.15 | 128.9 | 17.0 |
| 35 | POM 2/66.8 | 3.2 | | | 30 | | | 0.01 | 131.0 | 16.1 |
| 36 | POM 2/79 | 1.0 | | | 20 | | | 0.38 | 67.9 | 13.1 |
| 37 | POM 2/78 | 2.0 | | | 20 | | | 0.16 | 71.0 | 12.9 |
| 38 | POM 2/77 | 3.0 | | | 20 | | | 0.09 | 81.6 | 11.4 |
| 39 | POM 2/68.4 | 1.6 | | 30 | | | | 0.15 | 128.1 | 13.7 |
| 40 | POM 2/66.8 | 3.2 | | 30 | | | | 0.01 | 138.6 | 11.7 |
| 41 | POM 2/79 | 1.0 | | 20 | | | | 0.45 | 29.3 | 13.2 |
| 42 | POM 2/78 | 2.0 | | 20 | | | | 0.22 | 87.5 | 11.7 |
| 43 | POM 2/77 | 3.0 | | 20 | | | | 0.11 | 98.5 | 11.4 |

TABLE 8

Properties of the extruded parison

| Samples | POM/% | MDI % | TDI % | TPU 1 % | TPU 2 % | TPE-E % | TPE-A % | MVR (190° C./2.16 kg) cm³/10 min | Complex shear viscosity η* at 0.1 rad/s and 190° C. Pas | Extrusion time die to top of mold s | Extrusion time top of mold to bottom s | Relative Parison diameter % |
|---|---|---|---|---|---|---|---|---|---|---|---|---|
| 34 | POM 2/68.4 | 1.6 | | | 30 | | | 0.15 | 56376 | 21.0 | 14.3 | 77 |
| 35 | POM 2/66.8 | 3.2 | | | 30 | | | 0.01 | 81846 | 21.3 | 16.0 | 85 |
| 36 | POM 2/79 | 1.0 | | | 20 | | | 0.38 | 23181 | 20.0 | 9.0 | 63 |
| 37 | POM 2/78 | 2.0 | | | 20 | | | 0.16 | 37787 | 20.3 | 12.3 | 74 |
| 38 | POM 2/77 | 3.0 | | | 20 | | | 0.09 | 49702 | 20.0 | 10.5 | 70 |
| 39 | POM 2/68.4 | 1.6 | | 30 | | | | 0.15 | 44487 | 24.5 | 10.0 | 63 |
| 40 | POM 2/66.8 | 3.2 | | 30 | | | | 0.01 | 80028 | 23.0 | 12.5 | 70 |
| 41 | POM 2/79 | 1.0 | | 20 | | | | 0.45 | 18961 | 23.5 | 7.5 | 57 |
| 42 | POM 2/78 | 2.0 | | 20 | | | | 0.22 | 32002 | 21.5 | 10.0 | 64 |
| 43 | POM 2/77 | 3.0 | | 20 | | | | 0.11 | 53703 | 21.0 | 10.7 | 67 |

The invention claimed is:

1. Method for the manufacturing of a container or parts of a container for volatile organic compounds (VOC) or compressed gases by extrusion blow molding a molding composition comprising:
   a) at least one polyoxymethylene (A) having terminal groups comprised of hydroxyl groups,
   b) at least one thermoplastic elastomer (B) and
   c) at least one coupling agent (C);
   wherein the coupling agent (C) couples the thermoplastic elastomer (B) to the polyoxymethylene (A) and comprises a polyisocyanate; and
   wherein the molding composition has
   a melt volume rate (MVR) of less than 3 g/10 min, determined according to ISO 1133 at 190° C. and 2.16 kg; and
   a Charpy Notched Impact Strength (CNI) at 23° C., determined according to ISO 179-1/1eA (CNI), of higher than 15 kJ/m², and
   a complex shear viscosity $\eta^*$ of higher than 8000 Pas determined at 0.1 rad/s and 190° C. according to ASTM D4440-08.

2. Method according to claim 1, wherein at least 25% of the terminal groups of the polyoxymethylene (A) are hydroxyl groups.

3. Method according to claim 1, wherein the polyoxymethylene (A) comprises at least 50 mol-% of —CH$_2$O— repeat units.

4. Method according to claim 1, wherein polyoxymethylene (A) is present in an amount ranging from 40 to 90 wt. % wherein the weight is based on the total weight of the molding composition.

5. Method according to claim 1, wherein the complex shear viscosity $\eta^*$ ranges between 8100 and 100000 Pas.

6. Method according to claim 1, wherein the coupling agent (C) is present in an amount ranging from 0.1 to 5 wt.-%, wherein weight-% is based on the total weight of the composition.

7. Method according to claim 1 wherein the thermoplastic elastomer (B) is selected from the group consisting of thermoplastic polyester elastomer (TPE-E), thermoplastic polyamide elastomer (TPE-A), thermoplastic polystyrene elastomer (TPE-S) which can be functionalized, thermoplastic polyolefin elastomer (TPE-O) which can be functionalized, thermoplastic polyurethane elastomer (TPE-U) and mixtures thereof.

8. Method according to claim 1, wherein the thermoplastic elastomer (B) is present in an amount of 3 wt.-% to 50 wt.-%, wherein the weight is based on the total weight of the composition.

9. Method according to claim 1, wherein the molding composition has a melt volume rate (MVR) of less than 2.5 g/10 min, determined according to ISO 1133 at 190° C. and 2.16 kg.

10. Method according to claim 1, wherein the molding composition has a Charpy Notched impact Strength (CNI) at −40° C., determined according to ISO 179-1/1eA (CNI) of higher than 10 kJ/m².

11. Method according to claim 1, wherein the molding composition has a Charpy Notched Impact Strength (CNI) at 23° C., determined according to ISO 179-1/1eA (CNI) of higher than 20 kJ/m².

12. Method according to claim 1 wherein the thermoplastic elastomer (B) is thermoplastic polyurethane elastomer (TPE-U).

13. Method according to claim 1, wherein at least 50% of the terminal groups of the polyoxymethylene (A) are hydroxyl groups.

14. Method according to claim 13, wherein the hydroxyl groups comprise hydroxyethylene groups.

15. Method according to claim 13, wherein the thermoplastic elastomer (B) comprises a thermoplastic polyurethane elastomer, and wherein the container is a fuel tank or gas tank.

* * * * *